(12) United States Patent
Miyauchi (10) Patent No.: US 10,225,422 B2
(45) Date of Patent: Mar. 5, 2019

(54) FEEDING DEVICE AND IMAGE READING APPARATUS

(71) Applicant: SEIKO EPSON CORPORATION, Tokyo (JP)

(72) Inventor: Keisuke Miyauchi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/667,950

(22) Filed: Aug. 3, 2017

(65) Prior Publication Data

US 2018/0041652 A1 Feb. 8, 2018

(30) Foreign Application Priority Data

Aug. 8, 2016 (JP) ................................. 2016-155310

(51) Int. Cl.
*H04N 1/04* (2006.01)
*H04N 1/00* (2006.01)
*G03G 15/00* (2006.01)

(52) U.S. Cl.
CPC ....... *H04N 1/00602* (2013.01); *G03G 15/602* (2013.01); *H04N 1/00604* (2013.01); *H04N 1/00615* (2013.01); *G03G 15/605* (2013.01); *G03G 15/6511* (2013.01); *G03G 2215/00189* (2013.01); *G03G 2215/00556* (2013.01); *H04N 1/00588* (2013.01); *H04N 1/00594* (2013.01)

(58) Field of Classification Search
CPC ........... H04N 1/00602; H04N 1/00604; H04N 1/00615; H04N 1/00588; H04N 1/00594; G03G 15/602; G03G 15/605; G03G 15/6511; G03G 2215/00189; G03G 2215/00556

USPC .................................................. 358/498, 496
See application file for complete search history.

(56) References Cited

U.S. PATENT DOCUMENTS

| | | | | |
|---|---|---|---|---|
| 7,571,905 B2 * | 8/2009 | Kim | ..................... | B65H 3/0684 271/109 |
| 2002/0033572 A1 * | 3/2002 | Takisawa | ............. | B65H 3/0669 271/109 |
| 2008/0143045 A1 * | 6/2008 | Yu | .......................... | B65H 9/004 271/245 |
| 2008/0203652 A1 * | 8/2008 | Yasukawa | ............. | B65H 3/063 271/117 |
| 2010/0133741 A1 * | 6/2010 | Sato | ..................... | B65H 3/0684 271/114 |
| 2012/0113488 A1 * | 5/2012 | MacHida | ............... | B65H 3/063 358/498 |

(Continued)

FOREIGN PATENT DOCUMENTS

JP 2014-047050 A 3/2014

*Primary Examiner* — Cheukfan Lee
(74) *Attorney, Agent, or Firm* — Workman Nydegger (57) ABSTRACT

Regarding a restricting member that includes a contact face configured to be brought into contact with at least one portion of edges of a bundle of media mounted on a medium mounting section, and that is configured to be switched to either a blocking attitude for blocking advancement of the edges of the bundle of media into a nip portion between a feeding roller and a separating roller or an opening attitude for permitting the advancement of the edges of the bundle of media into the nip portion, the restricting member allows, in the blocking attitude, an edge shape of the bundle of media in contact with the contact face to be formed into a shape that fills in a tapered space tapering toward the nip portion.

8 Claims, 9 Drawing Sheets

(56) References Cited

U.S. PATENT DOCUMENTS

| | | | |
|---|---|---|---|
| 2013/0321886 A1* | 12/2013 | Adachi | H04N 1/00602 |
| | | | 358/498 |
| 2014/0061998 A1 | 3/2014 | Kasashima et al. | |
| 2016/0251174 A1* | 9/2016 | Kuriki | B65H 3/0669 |
| | | | 271/10.11 |
| 2017/0008712 A1* | 1/2017 | Tateishi | B65H 3/0684 |
| 2017/0107068 A1* | 4/2017 | Kanamitsu | H04N 1/00628 |
| 2017/0126912 A1* | 5/2017 | Shuto | B65H 3/063 |
| 2017/0366696 A1* | 12/2017 | Koyanagi | H04N 1/1215 |

\* cited by examiner

FEEDING DEVICE AND IMAGE READING APPARATUS

The entire disclosure of Japanese Patent Application No: 2016-155310, filed Aug. 8, 2016 is expressly incorporated by reference herein in its entirety.

BACKGROUND

1. Technical Field

The present invention relates to a feeding device for feeding media, and an image reading apparatus including the feeding device.

2. Related Art

A scanner, an example of image reading apparatuses, is sometimes configured to include a feeding device for automatically feeding each of documents (this type of feeding device being also called an ADF (Auto Document Feeder)) to enable execution of automatic feeding and reading of plural sheets of documents.

For example, in JP-A-2014-47050, there is disclosed a feeding device that is capable of setting a plurality of single cut sheets of paper (media) in a stacked state on a medium tray, and that includes a feeding roller (a paper feeding roller 113 in JP-A-2014-47050) capable of feeding the sheets of paper having been set by rotating in contact with a surface of each of the sheets of paper, and a separating roller (a retard roller 114 in JP-A-2014-47050) that separates sheets of paper while being coupled to the feeding roller.

The feeding roller described in JP-A-2014-47050 is configured to feed sequentially from a lower side sheet of paper, that is, a sheet of paper at a mounting-face side of the medium tray, among the plural sheets of paper (hereinafter referred to as a bundle of sheets of paper) stacked on the medium tray. Further, upper sheets of paper among the bundle of sheets of paper, that is, the sheets of paper to be separated by the separating roller, are configured to allow the edges of the upper sheets of paper to be brought into contact with the separating roller and thereby be blocked from advancing toward a downstream side.

Here, in such a feeding device, a preliminary separation means for making a preliminary separation is sometimes disposed at an upstream side of the separating roller in a medium feeding direction.

The feeding device described in JP-A-2014-47050 includes a set guide mechanism 120. The set guide mechanism 120 includes a flap 112, and this flap 112 serves as the preliminary separation means. When sheets of paper are fed from the medium tray, the flap 112 is allowed to swing toward the side of the retard roller 114, serving as the separating roller, to form an inclined plane. Further, a configuration that allows, as shown in FIG. 5A in JP-A-2014-47050, the edges of the bundle of sheets of paper to be handled so as to be brought into an inclined state following the inclined plane of the flap 112 is made to decrease the number of sheets of paper allowed to enter a separating portion of the retard roller 114 (i.e., a nip portion between the retard roller 114 and the paper feeding roller 113).

In conventional feeding devices, such as that in JP-A-2014-47050, however, when the edges of the bundle of sheets of paper are brought into contact with the retard roller 114, a gap space arises between an edge side of the bundle of sheets of paper and the nip portion between the retard roller 114 and the paper feeding roller 113, and a situation in which sheets of paper bend due to the gap space, thereby causing a jam to arise has sometimes occurred.

SUMMARY

An advantage of some aspects of the invention is that, in a feeding device that feeds from the lowest medium among media having been set, and an image reading apparatus including the feeding device, each of the media is enabled to be separated with further certainty when the media are fed.

According to a first aspect of the invention, a feeding device includes a medium mounting section configured to mount a bundle of a plurality of media stacked on one another; a feeding roller configured to feed a lowest medium among the bundle of media mounted on the medium mounting section; a separating roller disposed at a position opposite the feeding roller and configured to separate the lowest medium from the bundle of media; and a restricting member that includes a contact face configured to be brought into contact with at least one portion of edges of the bundle of media mounted on the medium mounting section, and that is configured to be switched to either a blocking attitude or an opening attitude, the blocking attitude being an attitude for blocking a medium feeding path at an upstream side of the separating roller to block advancement of the edges of the bundle of media mounted on the medium mounting section into a nip portion between the feeding roller and the separating roller, the opening attitude being an attitude for opening the medium feeding path to permit the advancement of the edges of the bundle of media into the nip portion. Further, in the blocking attitude, the restricting member allows an edge shape of the bundle of media in contact with the contact face to be formed into a shape that fills in a tapered space tapering toward the nip portion, between the feeding roller and the separating roller.

According to this aspect, when the restricting member is in the blocking attitude, an edge shape of the bundle of media in contact with the contact face is formed into a shape that fills in a tapered shape tapering toward a nip portion between the feeding roller and the separating roller. Thus, when the restricting member is brought into the opening attitude, a gap space between the nip portion and an edge side of the bundle of media is made small. Accordingly, the problem in that media bend due to the gap space, thereby causing a jam to arise is minimized or eliminated. With the configuration described above, each medium among the bundle of media is separated by the separating roller with certainty and is fed toward a downstream side.

According to a second aspect of the invention, in the first aspect, the feeding device further includes a biasing mechanism configured to bias the restricting member toward a side of the blocking attitude; a pressing unit disposed so as to advance/retreat relative to the feeding roller and configured to advance relative to the feeding roller to press the media mounted on the medium mounting section toward a side of the feeding roller; and a spacing unit disposed opposite the pressing unit and configured to be switched to either an advanced state in which the spacing unit has advanced to the medium feeding path or a retreated state in which the spacing unit has retreated from the medium feeding path, and to, in a state in which the spacing unit has advanced to the medium feeding path, support the media mounted on the medium mounting section to allow the lowest medium to be spaced from the feeding roller. Further, the restricting member is disposed on the pressing unit, and an engaged portion to be engaged with a tip of the restricting member is disposed on the spacing unit. In a state in which the pressing unit has retreated from the feeding roller and the spacing unit has advanced to the medium feeding path, the tip of the restricting member is engaged with the engaged portion to allow the blocking attitude to be kept. In a state in which the pressing unit has advanced to the feeding roller and the spacing unit has retreated from the medium feeding path, the engagement of the tip of the restricting member with the engaged portion is released to allow the restricting member to be ready for attitude switching.

According to this aspect, the attitude switching of the restricting member is performed in conjunction between the pressing unit and the spacing unit. With this configuration, the simplification of the device configuration and the cost reduction are achieved.

According to a third aspect of the invention, in the second aspect, the restricting member is configured to, in the blocking attitude, allow a tapered shape formed by the contact face and a medium supporting face of the spacing unit to be formed into a tapered shape the same as or narrower than a tapered shape tapering toward the nip portion, between the feeding roller and the separating roller, in a side view seen from a width direction intersecting with a medium feeding direction.

According to this aspect, when the edges of the bundle of media are brought into contact with the contact face of the restricting member taking the blocking attitude, a tapered shape formed by the contact face and a medium supporting face of the spacing unit is formed into a shape the same as or narrower than a tapered shape tapering toward the nip portion, between the feeding roller and the separating roller. Thus, when the restricting member is brought into the opening attitude, a gap space between the nip portion and the edge side of the bundle of media is made small with certainty.

According to a fourth aspect of the invention, in any one of the first to third aspects of the invention, the restricting member is configured to, at an upstream side of the separating roller, include a free tip at a side near the medium feeding path and a swing center at a side far from the medium feeding path, and be switched to either the blocking attitude or the opening attitude in conjunction with swing of the free tip about an axis on the swing center. Further, the contact face includes a curved surface expanding toward a side of the medium feeding path.

According to this aspect, the contact face includes a curved surface expanding toward the side of the medium feeding path. Thus, the edges of the bundle of media are handled further effectively.

According to a fifth aspect of the invention, in any one of the first to third aspects, the restricting member is configured to, at an upstream side of the separating roller, include a free tip at a side near the medium feeding path and a swing center at a side far from the medium feeding path, and be switched to either the blocking attitude or the opening attitude in conjunction with swing of the free tip about an axis on the swing center. Further, the restricting member includes a first arm portion extending toward an upstream side from the swing center and a second arm portion including the contact face and extending toward a downstream side from a position located on the first arm portion and distanced from the swing center.

According to this aspect, the restricting member is configured to allow the first arm portion to extend once toward an upstream side from the swing center and allow the second arm portion including the contact face to extend toward a downstream side from a position located on the first arm portion and distanced from the swing center. Thus, a compact configuration of the restricting member is achieved.

According to a sixth aspect of the invention, in any one of the first to fifth aspects, the contact face is formed into a friction surface.

According to this aspect, the contact face is formed into a friction surface. Thus, this configuration facilitates handling the edges of the bundle of media in contact with the contact face.

According to a seventh aspect of the invention, in any one of the first to sixth aspects, the contact face includes a plurality of steps.

According to this aspect, the contact face includes a plurality of steps. Thus, this configuration facilitates handling the edges of the bundle of media in contact with the contact face to a further degree.

According to an eighth aspect of the invention, an image reading apparatus includes a reading section configured to read an image on a medium, and the feeding device according to any one of the first to seventh aspects and configured to feed the medium toward the reading section.

According to this aspect, in an image reading apparatus including a reading section configured to read an image on a medium, when the medium is fed toward the reading section, the same operational advantage as that of any one of the first to seventh aspects is achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Practice Example 1

First, the outline of an image reading apparatus according to practice example 1, a practice example of the invention, will be described. Here, as an example of the image reading apparatus according to this practice example 1, a document scanner capable of reading at least one surface among the obverse surface and the reverse surface of a document is taken (this document scanner being referred to as just a scanner 1 hereinafter).

Figure 1:
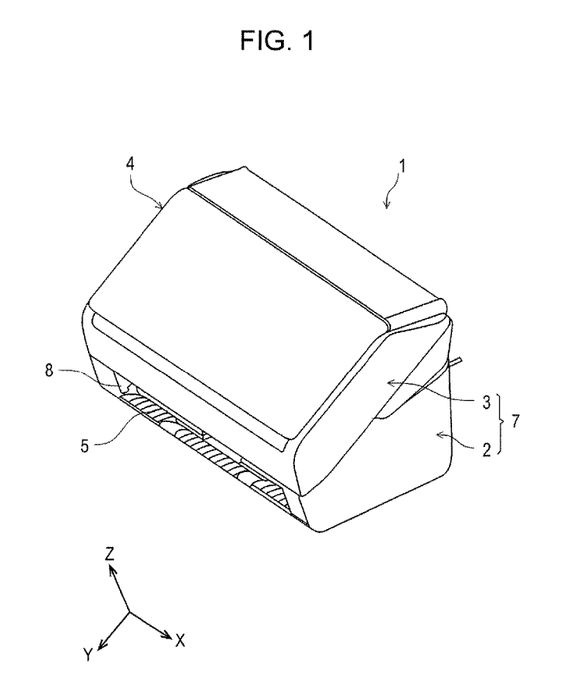
FIG. 1 is an external perspective view of a scanner according to an embodiment of the invention.
Figure 2:
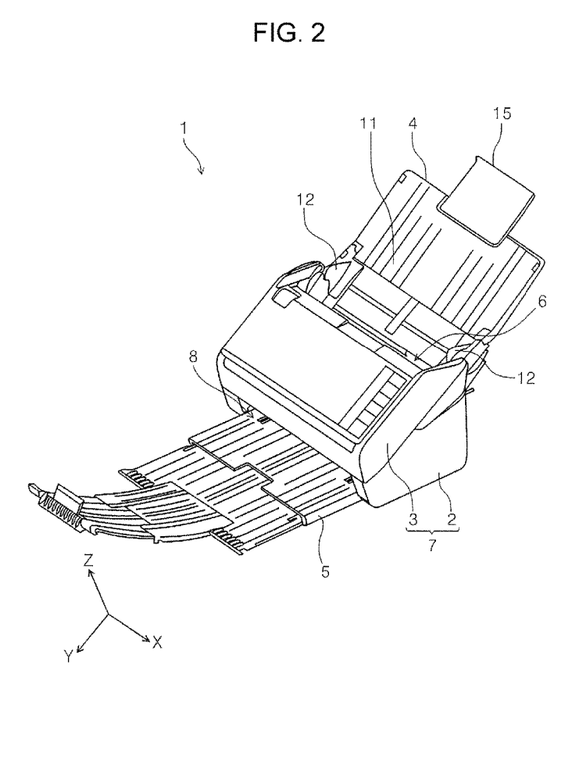
FIG. 2 is a perspective view of the scanner according to the embodiment of the invention illustrating a feeding state of the scanner.
Figure 3:
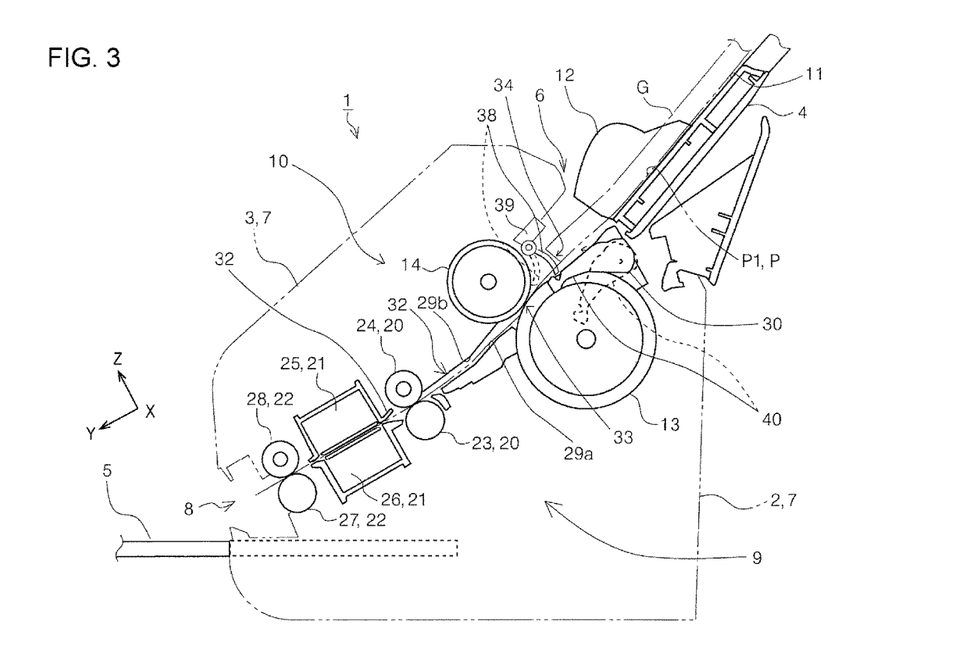
FIG. 3 is a side cross-sectional view of the scanner according to the embodiment of the invention illustrating a transport path of the scanner.
Figure 4:
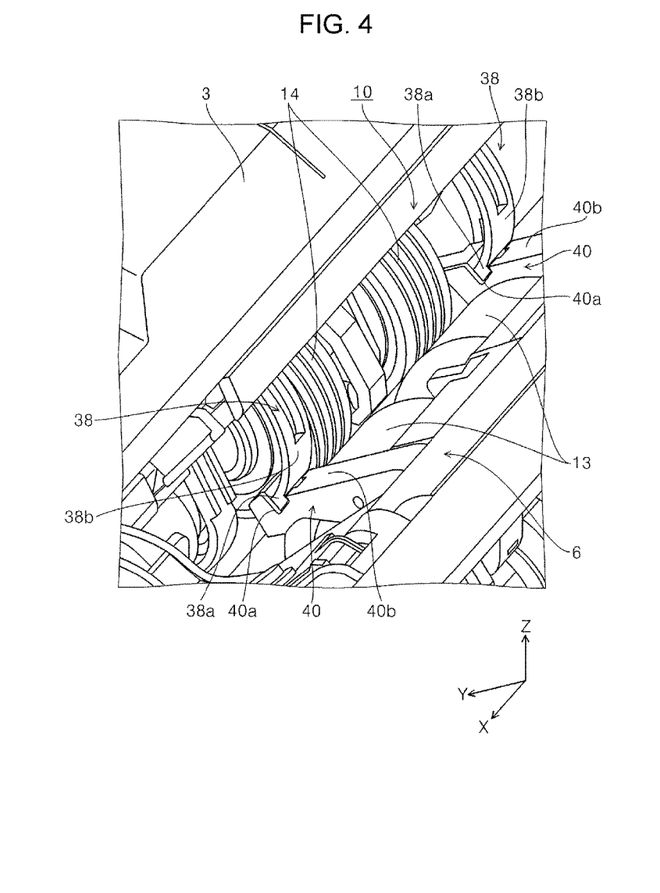
FIG. 4 is a perspective view of a feeding device according to the embodiment of the invention.
Figure 5:
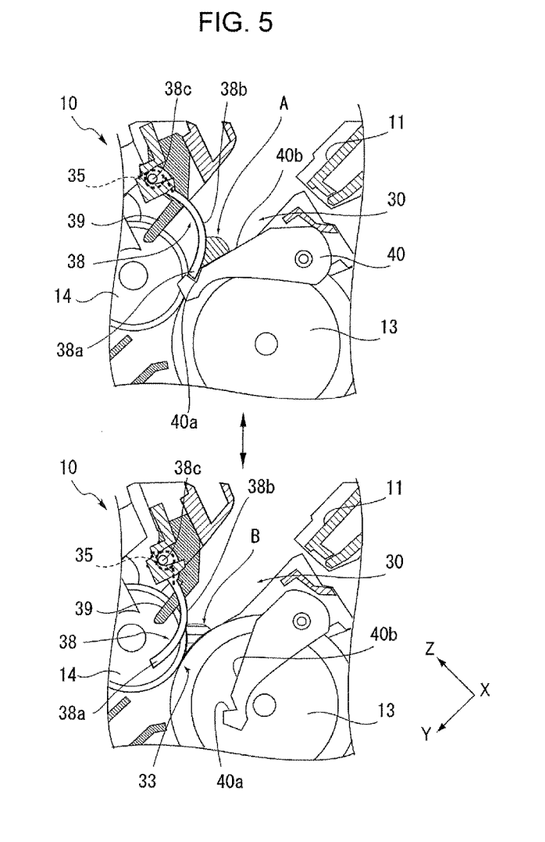
FIG. 5 is a side cross-sectional view of the feeding device according to the embodiment of the invention.
Figure 6:
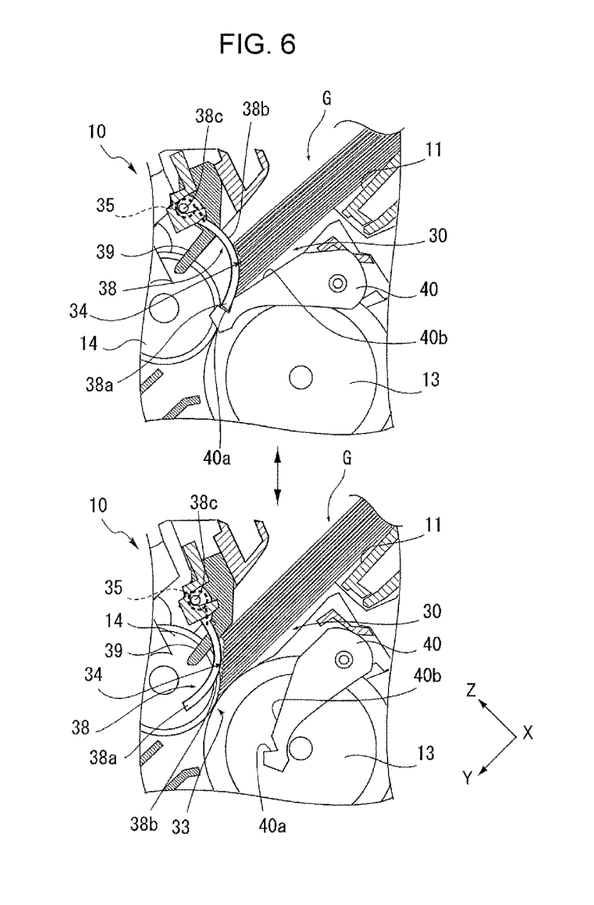
FIG. 6 is another side cross-sectional view of the feeding device according to the embodiment of the invention.
Figure 9:
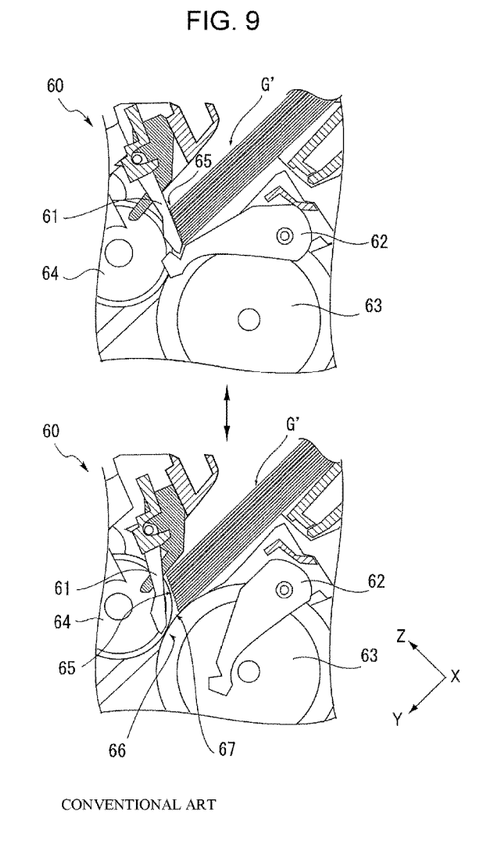
FIG. 9 is a side cross-sectional view of a conventional feeding device.

FIG. 1 is an external perspective view of the scanner 1 according to this practice example 1. FIG. 2 is a perspective view of the scanner 1 according to this practice example 1 illustrating a feeding state of the scanner 1. FIG. 3 is a side cross-sectional view of the scanner 1 according to this practice example 1 illustrating a transport path of the scanner 1. FIG. 4 is a perspective view of a feeding device according to this practice example 1. FIG. 5 is a side cross-sectional view of the feeding device according to this practice example 1. FIG. 6 is another side cross-sectional view of the feeding device according to this practice example 1. FIG. 9 is a side cross-sectional view of a conventional feeding device.

Outline of Scanner

In the following, the scanner 1, exemplified as an image reading apparatus according to the invention, will be described.

The scanner 1 illustrated in FIGS. 1 to 3 includes a housing 7 and a device body 9 (see FIG. 3). The housing 7 constitutes part of a device appearance, and the device body 9 is disposed inside the housing 7. The device body 9 illustrated in FIG. 3 includes a feeding device 10 and an image reading section 21. The feeding device 10 is an embodiment of a "feeding device" according to the invention. The image reading section 21 reads an image on a document fed by the feeding device 10.

The housing 7 is constituted by a lower unit 2 and an upper unit 3. The lower unit 2 constitutes a lower portion of the housing 7, and the upper unit 3 is opened/closed relative to the lower unit 2.

Note that, in an X-Y-Z coordinate system denoted in each the figures, an X-axis direction corresponds to a device width direction, that is, a paper width direction, and a Y-axis direction corresponds to a paper transport direction. A Z-axis direction is a direction intersecting with the Y-axis direction and denotes a direction approximately orthogonal to a face of a transported sheet of paper. Further, it is defined that a +Y-direction side corresponds to a device front side, and a −Y-direction side corresponds to a device rear side. Moreover, it is defined that, in a view from the device front side, a right-hand side corresponds to a +X-direction side, and a left-hand side corresponds to a −X-direction side. Furthermore, it is defined that a +Z-direction side corresponds to a device upper side (including an upper portion, an upper face, and the like), and a −Z-direction side corresponds to a device lower side (including a lower portion, a lower face, and the like).

Further, a sheet of paper P, which is a draft read by the scanner 1 and will be described below as the "medium" in the invention, is configured to be transported toward the +Y-direction side in each of the figures. In the following, a direction in which the sheet of paper P is transported (i.e., the +Y-direction side) will be referred to as the "downstream", and a direction reverse to the above direction (i.e., the −Y-direction side) will be referred to as the "upstream".

The upper unit 3 is attached to the lower unit 2 so as to be pivotable relative to the lower unit 2 about a pivot supporting point on a downstream side in the paper transport direction (i.e., on the +Y-direction side). The upper unit 3 is configured to take two states: one being a closed state (see FIG. 2) in which the upper unit 3 is closed relative to the lower unit 2 and constitutes a paper transport path of the sheet of paper P together with the lower unit 2; the other one being an opened state (not illustrated) in which the upper unit 3 has been pivoted to the device front side relative to the lower unit 2 to allow the paper transport path of the sheet of paper P to be exposed and thereby facilitate maintenance operations, such as a process for a jam of the sheet of paper P.

A paper support 4 (FIG. 2) is disposed in an upper portion of the upper unit 3. The paper support 4 is opened/closed relative to the upper unit 3.

The paper support 4 is configured to take two states: one being a non-feeding state in which, as shown in FIG. 1, the paper support 4 covers an upper portion and a feeding inlet 6 (see FIG. 2) of the upper unit 3; the other one being a feeding state in which, as shown in FIG. 2, the paper support 4 has been pivoted to the device rear side from the non-feeding state shown in FIG. 1 to allow the feeding inlet 6 to open and further enable the sheet of paper P to be set on the rear face of the paper support 4 (this rear face being a medium mounting section 11, that is, a medium mounting section for the sheet of paper P). In the feeding state, the paper support 4 is capable of supporting plural sheets of paper P (a bundle G of sheets of paper in FIG. 3) on the medium mounting section 11.

Further, an auxiliary paper support 15 (FIG. 2) is disposed at the upstream side of the paper support 4. The auxiliary paper support 15 is configured to be storable and drawable relative to the paper support 4.

A discharge outlet 8 is disposed at the device front side of the lower unit 2. The discharge outlet 8 discharges the sheet of paper P. Further, the lower unit 2 includes a paper discharge tray 5. The paper discharge tray 5 is drawable from the discharge outlet 8 toward the device front side. The paper discharge tray 5 is configured to take two states: one being a state in which the paper discharge tray 5 is stored in a bottom portion of the lower unit 2 (see FIG. 1); the other one being a state in which the paper discharge tray 5 is drawn to the device front side (see FIG. 2). Further, in this practice example 1, the paper discharge tray 5 is constituted by a plurality of coupled tray members to enable the length of its portion drawn from the discharge outlet 8 be adjusted in accordance with the length of the sheet of paper P to be discharged.

Regarding Transport Path in Scanner

Next, a transport path in the scanner 1 will be described with reference to mainly FIG. 3.

The sheet of paper P to be set in the feeding inlet 6 is mounted on the medium mounting section 11. The feeding inlet 6 is capable of mounting therein the bundle G of sheets of paper (the bundle of media), in which the plural sheets of paper P are stacked.

In addition, in FIG. 3, a sign 12 denotes a pair of edge guides for guiding both width-direction (X-axis direction) side edges of the paper P (also see FIG. 2). The pair of edge guides 12 is disposed so as to be sliding-movable in the X-axis direction in accordance with the size of the sheet of paper P.

The bundle G of sheets of paper having been set in the feeding inlet 6 is fed and transported toward the image reading section 21, described later, by the feeding device 10. The feeding device 10 includes a feeding roller 13, and this feeding roller 13 feeds lowest sheet of paper P1, that is, the lowest sheet of paper among the bundle G of sheets of paper having been mounted on the medium mounting section 11, by rotating in contact with the lowest paper P1.

A separating roller 14 is disposed at a position opposite the feeding roller 13. The separating roller 14 nips the sheet of paper P in a portion between itself and the feeding roller 13 to separate the lowest sheet of paper P1 from the bundle G of sheets of paper.

In this practice example 1, the feeding roller 13 and the separating roller 14 are disposed at approximately central positions in the device width direction intersecting with the paper transport direction.

In addition, the outer circumference face of each of the feeding roller 13 and the separating roller 14 is composed of a high-friction material (elastomer such as rubber, or any other like material).

The lowest sheet of paper P1 (hereinafter described as just the sheet of paper P) is picked up and transported toward the downstream side (the +Y-direction side) by the feeding roller 13. The feeding roller 13 is disposed so as to be rotatable relative to the lower unit 2. Specifically, the feeding roller 13 feeds the sheet of paper P toward the downstream side by rotating in contact with a surface constituting the sheet of paper P and facing the mounting face of the medium mounting section 11. Thus, in the scanner 1, in the case where the bundle G of sheets of paper (i.e., the plural sheets of paper P) is set in the feeding inlet 6, the bundle G of sheets of paper are fed toward the downstream side sequentially from a lower side sheet of paper.

A restricting member 38, described below as the "restricting member", is disposed at the upstream side of the separating roller 14. The restricting member 38 is configured to, at the upstream side of the separating roller 14, be switched to either a blocking attitude (an attitude represented by a full line with respect to the restricting member 38 in FIG. 3) for blocking a medium feeding path 30 or an opening attitude (an attitude represented by a dotted line with respect to the restricting member 38 in FIG. 3) for opening the medium feeding path 30.

Before the start of feeding the bundle G of sheets of paper, the restricting member 38 takes the blocking attitude to block advancement of edges 34 of the bundle G of sheets of paper mounted on the medium mounting section 11 into a nip portion 33. This nip portion 33 is a portion between the feeding roller 13 and the separating roller 14. Further, when the restricting member 38 has entered the opening attitude, the restricting member 38 opens the medium feeding path 30 to permit the advancement of the edges 34 of the bundle G of sheets of paper into the nip portion 33. The restricting member 38 is disposed at each of both width-direction sides sandwiching the separating roller 14 therebetween (see FIG. 4), and includes a contact face 38$b$. This contact face 38$b$ is brought into contact with at least one portion of the edges 34 of the bundle G of sheets of paper mounted on the medium mounting section 11. Note that the restricting member 38 will be further elaborated later.

The restricting member 38 is disposed on a pressing unit 39 (see not only FIG. 3, but also FIGS. 5 and 6). The restricting member 38 is biased toward the side of the blocking attitude by a biasing means 35 (FIGS. 5 and 6).

The pressing unit 39 is disposed so as to advance/retreat relative to the feeding roller 13, and advances to press the sheet of paper P mounted on the medium mounting section 11 toward the side of the feeding roller 13.

A spacing unit 40 is disposed at the periphery of the feeding roller 13. The spacing unit 40 is disposed opposite the pressing unit 39, and is configured to be switched to either an advanced state in which the spacing unit 40 has advanced to the medium feeding path 30 (a state represented by a full line with respect to the spacing unit 40 in FIG. 3) or a retreated state in which the spacing unit 40 has retreated from the medium feeding path 30 (a state represented by a dotted line with respect to the spacing unit 40 in FIG. 3).

Moreover, an engaged portion 40$a$ is disposed on the spacing unit 40. The engaged portion 40$a$ is engaged with a tip 38$a$ of the restricting member 38 (FIGS. 5 and 6). In a state in which the pressing unit 39 has retreated from the feeding roller 13 and the spacing unit 40 has advanced to the medium feeding path 30, the tip 38$a$ of the restricting member 38 is engaged with the engaged portion 40$a$ to allow the blocking attitude to be kept. In a state in which the pressing unit 39 has advanced to the feeding roller 13 and the spacing unit 40 has retreated from the medium feeding path 30, the engagement of the tip 38$a$ of the restricting member 38 with the engaged portion 40$a$ is released to configure the restricting member 38 to be ready for attitude switching.

In other words, the configuration is made such that, in the case where the tip 38$a$ of the restricting member 38 is engaged with the engaged portion 40$a$ of the spacing unit 40, the advancement of the pressing unit 39 relative to the feeding roller 13 is blocked; whereas, in the case where the engagement of the tip 38$a$ of the restricting member 38 with the engaged portion 40$a$ of the spacing unit 40 is released, the advancement of the pressing unit 39 relative to the feeding roller 13 is permitted.

Before the start of the feeding, the bundle G of sheets of paper is supported from below and pushed up by the spacing unit 40 taking the advanced state, in which the spacing unit 40 has advanced to the medium feeding path 30, and thereby, the lowest sheet of paper P1 among the bundle G of sheets of paper is allowed to be spaced from the feeding roller 13. That is, the contact with the feeding roller 13 is blocked.

Upon start of feeding the sheet of paper P, the spacing unit 40 is brought into the retreated state, in which the spacing unit 40 has retreated downward, to bring the lowest sheet of paper among the bundle G of sheets of paper into contact with the feeding roller 13, and further allow the engagement of the tip 38$a$ of the restricting member 38 with the engaged portion 40$a$ of the spacing unit 40 to be released to allow the restricting member 38 to enter a swing ready state (an attitude-switching ready state). When the lowest sheet of paper P is fed out toward the downstream side by the rotation of the feeding roller 13, the restricting member 38 is allowed to swing toward the downstream side by the fed-out sheet of paper P, and takes the opening attitude for opening the medium feeding path 30.

In this practice example 1, as described above, the attitude switching of the restricting member 38 is performed in conjunction between the pressing unit 39 and the spacing unit 40. With this configuration, the simplification of the device configuration and the cost reduction with respect to the feeding device 10 are achieved.

In addition, the spacing unit 40 is configured to be switched to the advanced state or the retreated state upon driving of a not-illustrated driving source (such as a motor) by control of a likewise not-illustrated controller.

A transport roller 20 is disposed at the upstream side of the feeding roller 13. The transport roller 20 is configured to include a transport driving roller 23 and a transport driven roller 24. The transport driving roller 23 is disposed in the lower unit 2. The transport driven roller 24 is disposed in the upper unit 3, and is driven and rotated relative to the transport drive roller 23.

The sheet of paper P having been fed by the feeding roller 13 is transported through a transport path 32. This transport path 32 is located at the downstream side of the feeding roller 13. The transport path 32 is constituted by guide faces (a lower guide face 29$a$ and an upper guide face 29$b$) facing to each other. The feeding roller 13 and the transport driving roller 23 are each disposed so as to allow a portion thereof to protrude relative to the lower guide face 29$a$.

The image reading section 21, described herein as the "reading section" configured to read an image, is disposed at the downstream side of the feeding roller 20, and the sheet of paper P is transported to the image reading section 21 by the transport roller 20.

The image reading section 21 includes an upper image reading sensor 25 and a lower image reading sensor 26. The upper image reading sensor 25 is disposed at the side of the upper unit 3, and the lower image reading sensor 26 is disposed at the side of the lower unit 2. In this practice example 1, the upper image reading sensor 25 and the lower image reading sensor 26 are each configured as a contact image sensor module (CISM).

After at least one surface among the obverse surface and the reverse surface of the sheet of paper P has been read by the image reading section 21, the sheet of paper P is fed by a discharge roller 22, and then is discharged from the discharge outlet 8. The discharge roller 22 is located at the downstream side of the image reading section 21, and the discharge outlet 8 is disposed at the device front side of the lower unit 2. The discharge roller 22 is constituted by a discharge driving roller 27 and a discharge driven roller 28. The discharge roller 27 is disposed in the upper unit 3. The discharge driven roller 28 is disposed in the upper unit 3, and is driven and rotated relative to the discharge driving roller 27.

In a state in which the discharge tray 5 is drawn, the sheet of paper P having been discharged from the discharge outlet 8 is stacked on the discharge tray 5.

Regarding Restricting Member

Subsequently, the restricting member 38 will be further described with reference to FIGS. 4 to 6.

The restricting member 38 is configured to, at the upstream side of the separating roller 14, include the tip 38a, described herein as the "free tip", at a side near the medium feeding path 30 and a swing center 38c at a side far from the medium feeding path 30, and be switched to either the blocking attitude (an upper figure in each of FIGS. 5 and 6) or the opening attitude (a lower figure in each of FIGS. 5 and 6) in conjunction with swing of the tip 38a about an axis on the swing center 38c.

As described above, the restricting member 38 takes the blocking attitude before the start of feeding the bundle G of sheets of paper.

At this time, the edges 34 of the bundle G of sheets of paper (see not only FIG. 6, but also FIG. 3) are brought into contact with the contact face 38b of the restricting member 38 taking the blocking attitude, and thereby form an edge shape following the contact face 38b.

In this practice example 1, the restricting member 38 is configured to, in the blocking attitude (the upper figure in each of FIGS. 5 and 6), allow the edge shape of the bundle G of sheets of paper in contact with the contact face 38b to be formed into a shape that fills in a tapered space B (the lower figure in FIG. 5), that is, a tapered space tapering toward the nip portion 33 between the feeding roller 13 and the separating roller 14.

More specifically, the contact face 38b of the restricting member 38 includes a curved surface expanding toward the side of the medium feeding path 30.

The curved surface of the contact surface 38b is set to a curvature approximately the same as that of the separating roller 14 in a side view seen from the width direction (the X-axis direction) intersecting with the paper transport direction. In the restricting member 38 taking the blocking attitude, that is, in the state in which the tip 38a of the restricting member 38 is engaged with the engaged portion 40a of the spacing unit 40, a space A (the upper figure in FIG. 5) forms a shape similar to the tapered space B (the lower figure in FIG. 5), tapering toward the nip portion 33. The space A is a space formed by the contact surface 38b of the restricting member 38 and a medium supporting face 40b of the spacing unit 40.

Here, in a conventional feeding device 60 illustrated in FIG. 9, a conventional restricting member 61 is allowed to take a blocking attitude (an upper figure in FIG. 9) to allow edges 65, that is, edges of a bundle G' of sheets of paper to be in contact with a separating roller 64, and thereafter, when feeding is started and the engagement of the restricting member 61 with a spacing unit 62 is released to allow the restricting member 61 to take an opening attitude (a lower figure of FIG. 9), a gap space 67 arises between a nip portion 66, that is, a nip portion between the separating roller 64 and the feeding roller 63, and the side of the edges 65 of the bundle G' of sheets of paper, and a situation in which sheets of paper bend due to the gap space 67, thereby causing a jam to arise is likely to occur.

As shown in the upper figure in FIG. 6, when the restricting member 38 in this practice example 1 is in the blocking attitude, the restricting member 38 enables an edge shape of the bundle G of sheets of paper in contact with the contact face 38b to be formed into a shape that fills in the space B, tapering toward the nip portion 33. With this configuration, as shown in the lower figure in FIG. 6, when the restricting member 38 has taken the opening attitude, a gap space between the nip portion 33 and the side of the edges 34 of the bundle G of sheets of paper (i.e., a space corresponding to the gap space 67 in FIG. 9) is made small. Accordingly, the problem in that media bend due to the gap space, thereby causing a jam to arise is minimized or eliminated. With the configuration described above, the sheet of paper P (the lowest sheet of paper P1) is separated by the separating roller 14 with certainty and is fed toward the downstream side.

Moreover, the contact face 38b is configured to include a curved surface expanding toward the side of the medium feeding path 30, thereby allowing the edges 34 of the bundle G of sheets of paper to be effectively handled.

Further, the contact face 38b of the restricting member 38 is preferred to be formed into a friction surface. For example, the contact face 38b of the restricting member 38 is preferred to be formed using a material having a high friction coefficient. Further, a friction material formed using a resin material having a high friction coefficient, such as rubber or cork, can be also adhered to the contact face 38b. Alternatively, the surface of the contact face 38b can be also formed into a roughened surface serving as the friction surface.

Forming the contact face 38b into such a friction surface facilitates handling the edges 34 of the bundle G of sheets of paper in contact with the contact face 38b to a further degree.

Note that, in this practice example 1, the restricting member 38, which is configured to swing about an axis on the swing center 38c, has been described as the "restricting member", but, without limited to this configuration, for example, the "restricting member" can be configured to advance/retreat relative to the medium feeding path 30 to take the blocking attitude/the opening attitude.

Moreover, not only the configuration that allows, as shown in FIG. 4, the restricting member 38 to be disposed at each of the both width-direction sides sandwiching the separating roller 14 therebetween, but also a configuration that allows the restricting member 38 to be disposed between two separating rollers 14 in the width direction can be made.

Another Configuration in Feeding Device

Note that, as another configuration in the feeding device, a vibrator (not illustrated) can be also provided and allowed to be engaged with the spacing unit 40. Further, the spacing unit 40 can be configured to vibrate when the restricting member 38 is engaged with the engaged portion 40a of the spacing unit 40 to take the blocking attitude.

This configuration allows the spacing unit 40 supporting the bundle G of sheets of paper to vibrate when the restricting member 38 takes the blocking attitude, and thus facilitates allowing the edges 34 of the bundle G of sheets of paper to follow the contact face 38b. With this configuration, the handling of the edges 34 of the bundle G of sheets of paper is facilitated.

Practice Example 2

Figure 7:
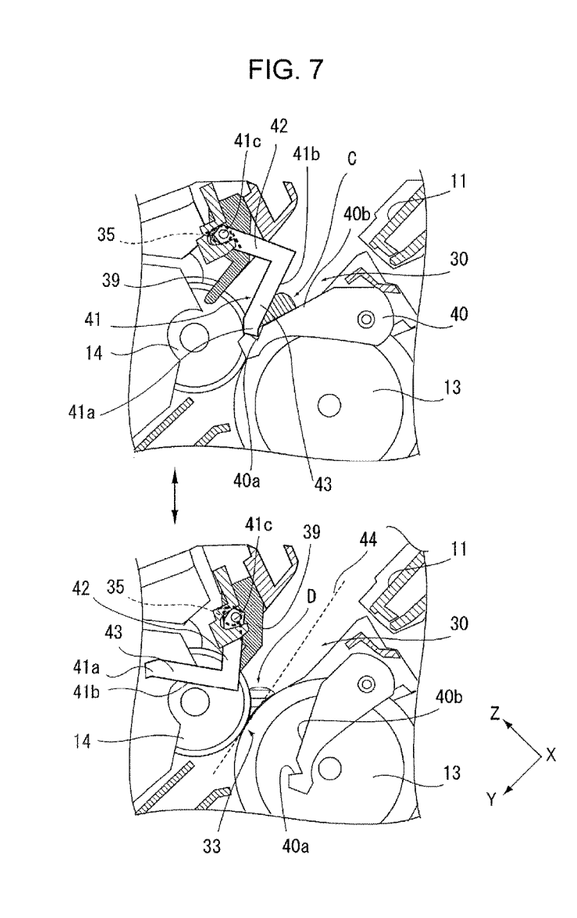
FIG. 7 is a side cross-sectional view of a feeding device according to another embodiment of the invention.

Practice example 2 will be described on the basis of FIG. 7. FIG. 7 is a side cross-sectional view of a feeding device according to practice example 2, another practice example of the invention. In this practice example 2, components identical to components of practice example 1 will be denoted by reference signs identical to those of the components of practice example 1 to omit the description of such components.

A restricting member 41 in this practice example 2 has a shape bent, such as shown in FIG. 7. More specifically, the restricting member 41 is configured to, at the downstream side of the separating roller 14, include a free tip 41a at a side near the medium feeding path 30 and a swing center 41c at a side far from the medium feeding path 30, and be switched to either the blocking attitude (an upper figure in FIG. 7) or the opening attitude (a lower figure in FIG. 7) in conjunction with swing of the tip 41a about an axis on the swing center 41c. Further, the restricting member 41 includes a first arm portion 42 and a second arm portion 43. The first arm portion 42 is configured to extend toward the upstream side from the swing center 41c. The second arm portion 43 includes the contact face 38b, and is configured to extend toward the downstream side from a position located on the first arm portion 42 and distanced from the swing center 41c.

Similarly to practice example 1, the restricting member 41 is configured to, as shown in the upper figure in FIG. 7, be kept in the blocking attitude by allowing the free tip 41a of the restricting member 41 (the free tip 41a being also a tip of the second arm portion 43) to be engaged with the engaged portion 40a of the spacing unit 40, and to, as shown in the lower figure in FIG. 7, take the opening attitude when the spacing unit 40 is brought into the retreated state.

Further, in this practice example 2, the restricting member 41 is configured to, in the blocking attitude (the upper figure in FIG. 7), allow a tapered shape C, that is, a tapered shape formed by the contact face 41b and the medium supporting face 40b of the spacing unit 40 to be formed into a tapered shape the same as or narrower than a tapered shape D (the lower figure in FIG. 7), that is, a tapered shape tapering toward the nip portion 33 between the feeding roller 13 and the separating roller 14 in a side view seen from the width direction (the X-axis direction) intersecting with the paper transport direction.

When the edges of the bundle G of sheets of paper (omitted from illustration in FIG. 7) is brought into contact with the contact face 41b of the restricting member 41 taking the blocking attitude, an edge shape of the bundle G of sheets of paper follows the tapered shape C, formed by the contact face 41b and the medium supporting face 40b of the spacing unit 40, and thus is formed into a tapered shape approximately the same as or narrower than the tapered shape D, tapering toward the nip portion 33 between the feeding roller 13 and the separating roller 14. Accordingly, when the restricting member 41 is brought into the opening attitude, a gap space between the nip portion 33 and the edge side of the bundle G of sheets of paper is made small with certainty. Note that, naturally, it is possible to apply this configuration to practice example 1.

In addition, the tapered shape C, formed by the contact face 41b and the medium supporting face 40b of the spacing unit 40, is further preferred to be particularly formed into a tapered shape the same as or narrower than a tapered shape formed by a tangent line 44, that is, a tangent line in the nip portion 33 (the lower figure in FIG. 7) and the roller face of the separating roller 14.

The restricting member 41 in this practice example 2 is configured to allow the first arm portion 42 to extend once toward the upstream side from the swing center 41c and allow the second arm portion 43 including the contact face 41b to extend toward the downstream side from a position located on the first arm portion 42 and distanced from the swing center 41c. Thus, a compact configuration of the restricting member 41 is achieved, and further, a configuration that allows the tapered shape C, formed by the contact face 41b and the medium supporting face 40b of the spacing unit 40, to be formed into a tapered shape the same as or narrower than the tapered shape D, tapering toward the nip portion 33, is achieved.

Here, any one of the first arm portion 42 and the second arm portion 43 may be curved. For example, the second arm portion 43 may be configured to have a curved surface expanding toward the side of the medium feeding path 30. Further, the contact face 41b may be formed into a friction surface.

Practice Example 3

Figure 8:
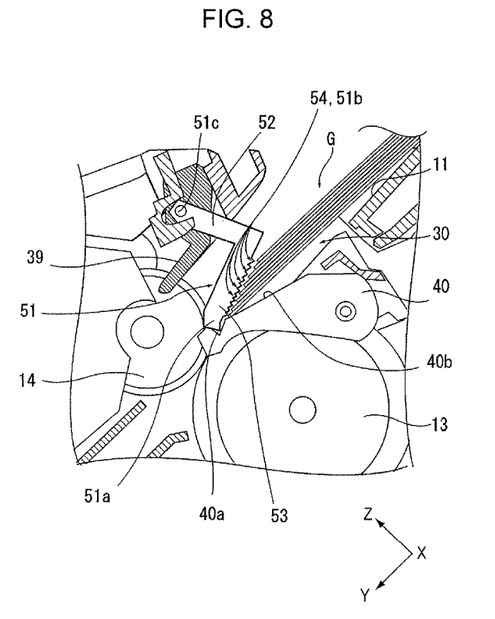
FIG. 8 is a side cross-sectional view of a feeding device according to further another embodiment of the invention.

Practice example 3 will be described on the basis of FIG. 8. FIG. 8 is a side cross-sectional view of a feeding device according to practice example 3, further another practice example of the invention. In this practice example 3, components identical to components of practice examples 1 and 2 will be denoted by reference signs identical to the components of practice examples 1 and 2 to omit the description of such components.

Similarly to practice example 2, a restricting member 51 in this practice example 3 includes a first arm portion 52 and a second arm portion 53, and is formed into a bent shape. In the restricting member 51, a sign 51a denotes a free tip, and a sign 51c denotes a swing center. Further, as shown in FIG. 8, a step portion 54 is provided on a contact face 51b of the restricting member 51. The step portion 54 includes a plurality of steps that is formed in a stepped shape.

In this manner, the contact face 38b is configured to include the step portion 54, and thus, this configuration facilitates handling the edges of the bundle G of sheets of paper in contact with the contact face 51b to a further degree.

In addition, the step portion 54 may be also provided on the contact face 38b formed into a curved surface, in such the restricting member 38 in practice example 1.

The invention is not otherwise limited to the foregoing embodiments, but various modifications thereof may be made within the scope of the invention set forth in appended claims. Naturally, such modifications are included in the scope of the invention. For example, a feeding device according to the invention may be used as a feeding device for a device other than the scanner, for example, a recording device, such as a printer.

The entire disclosure of Japanese Patent Application No. 2016-155310, filed Aug. 8, 2016 is expressly incorporated by reference herein.

What is claimed is:

1. A feeding device comprising:
a medium mounting section configured to mount a bundle of a plurality of media stacked on one another;
a feeding roller configured to feed a lowest medium among the bundle of media mounted on the medium mounting section;
a separating roller disposed at a position opposite the feeding roller and configured to separate the lowest medium from the bundle of media; and
a restricting member including a contact face configured to be brought into contact with at least one portion of edges of the bundle of media mounted on the medium mounting section, the restricting member being configured to be switched to either a blocking attitude or an opening attitude, the blocking attitude being an attitude for blocking a medium feeding path at an upstream side of the separating roller to block advancement of the edges of the bundle of media mounted on the medium mounting section into a nip portion between the feeding roller and the separating roller, the opening attitude being an attitude for opening the medium feeding path to permit the advancement of the edges of the bundle of media into the nip portion;
wherein, in the blocking attitude, the restricting member allows an edge shape of the bundle of media in contact with the contact face to be formed into a shape that fills in a tapered space tapering toward the nip portion, between the feeding roller and the separating roller.

2. The feeding device according to claim 1, further comprising:
a biasing mechanism configured to bias the restricting member toward a side of the blocking attitude;
a pressing unit disposed so as to advance/retreat relative to the feeding roller and configured to advance relative to the feeding roller to press the media mounted on the medium mounting section toward a side of the feeding roller; and
a spacing unit disposed opposite the pressing unit and configured to be switched to either an advanced state in which the spacing unit has advanced to the medium feeding path or a retreated state in which the spacing unit has retreated from the medium feeding path, and to, in a state in which the spacing unit has advanced to the medium feeding path, support the media mounted on the medium mounting section to allow the lowest medium to be spaced from the feeding roller, wherein the restricting member is disposed on the pressing unit, and an engaged portion to be engaged with a tip of the restricting member is disposed on the spacing unit,
wherein, in a state in which the pressing unit has retreated from the feeding roller and the spacing unit has advanced to the medium feeding path, the tip of the restricting member is engaged with the engaged portion to allow the blocking attitude to be kept, and
wherein, in a state in which the pressing unit has advanced to the feeding roller and the spacing unit has retreated from the medium feeding path, the engagement of the tip of the restricting member with the engaged portion is released to allow the restricting member to be ready for attitude switching.

3. The feeding device according to claim 2, wherein the restricting member is configured to, in the blocking attitude, allow a tapered shape formed by the contact face and a medium supporting face of the spacing unit to be formed into a tapered shape same as or narrower than a tapered shape tapering toward the nip portion, between the feeding roller and the separating roller, in a side view seen from a width direction intersecting with a medium feeding direction.

4. The feeding device according to claim 1,
wherein the restricting member is configured to, at an upstream side of the separating roller, include a free tip at a side near the medium feeding path and a swing center at a side far from the medium feeding path, and be switched to either the blocking attitude or the opening attitude in conjunction with swing of the free tip about an axis on the swing center, and
wherein the contact face includes a curved surface expanding toward a side of the medium feeding path.

5. The feeding device according to claim 1,
wherein the restricting member is configured to, at an upstream side of the separating roller, include a free tip at a side near the medium feeding path and a swing center at a side far from the medium feeding path, and be switched to either the blocking attitude or the opening attitude in conjunction with swing of the free tip about an axis on the swing center, and
wherein the restricting member includes a first arm portion extending toward an upstream side from the swing center and a second arm portion including the contact face and extending toward a downstream side from a position located on the first arm portion and distanced from the swing center.

6. The feeding device according to claim 1, wherein the contact face is formed into a friction surface.

7. The feeding device according to claim 1, wherein the contact face includes a plurality of steps.

8. An image reading apparatus comprising:
a reading section configured to read an image on a medium; and
the feeding device according to claim 1 and configured to feed the medium toward the reading section.

* * * * *